United States Patent
Shiban (10) Patent No.: US 9,115,688 B1
(45) Date of Patent: Aug. 25, 2015

(54) WIND RESISTANCE WAVE GENERATOR

(71) Applicant: Innovative Engineering Solutions, Inc., Chandler, AZ (US)

(72) Inventor: Samir S. Shiban, Chandler, AZ (US)

(73) Assignee: Innovative Engineering Solutions, Inc., Chandler, AZ (US)

( * ) Notice: Subject to any disclaimer, the term of this patent is extended or adjusted under 35 U.S.C. 154(b) by 140 days.

(21) Appl. No.: 13/917,213

(22) Filed: Jun. 13, 2013

(51) Int. Cl.
- *F03B 13/20* (2006.01)
- *B63B 35/00* (2006.01)
- *F03D 9/00* (2006.01)

(52) U.S. Cl.
CPC ............... *F03B 13/20* (2013.01); *B63B 35/00* (2013.01); *F03D 9/003* (2013.01)

(58) Field of Classification Search
CPC .......... Y02E 10/38; Y02E 10/28; Y02E 10/22
USPC .................................................. 290/42, 53
See application file for complete search history.

(56) References Cited

U.S. PATENT DOCUMENTS

| | | | | |
|---|---|---|---|---|
| 3,728,749 A | * | 4/1973 | Eby et al. | 441/1 |
| 3,884,042 A | * | 5/1975 | Anderson et al. | 405/27 |
| 5,820,295 A | * | 10/1998 | Buteaux | 405/21 |
| 2009/0309365 A1 | * | 12/2009 | Sauer et al. | 290/53 |
| 2011/0254275 A1 | * | 10/2011 | Joseph | 290/53 |
| 2012/0200156 A1 | * | 8/2012 | Weller | 307/21 |
| 2013/0026762 A1 | * | 1/2013 | Rajadhyaksha et al. | 290/54 |

* cited by examiner

*Primary Examiner* — Tulsidas C Patel
*Assistant Examiner* — Sean Gugger
(74) *Attorney, Agent, or Firm* — James Creighton Wray (57) ABSTRACT

A new wind resisting electricity generator that floats offshore supported by buoyancy-providing used tires filled with waterproof foam. Electricity is generated through water turbines, uniformly rotated using waves and under water currents, and through directional wind turbines. Used tires are mounted on a mechanical and electrical utilities structure and a wind energy structure to interrupt wind flow near water surfaces in onshore directed weather. Dummy floats that provide protection from floating debris for the water turbines and direct waves to the upper turbine blades are alternated with generator floats in a line offshore and are held together with connecting chains and recycled tires mounted on the connecting chains.

22 Claims, 10 Drawing Sheets

Concept for cost effective resisistance and conversion of fluid motion to electrical energy.

WIND RESISTANCE WAVE GENERATOR

BACKGROUND OF THE INVENTION

Problems exist of accumulating piles of used tires having no value with little incentive to reduce the mass of waste.

The way the world produces and uses energy today is not sustainable. A transition to renewable energy sources is possible, cost-effective, and would provide energy that is affordable for all. It may be produced in ways that can be sustained by the global economy.

Needs exist for renewable energy generators and a reduction in used tire waste.

SUMMARY OF THE INVENTION

A floatable generator and high speed wind resister has a support and wave energy structure with multiple buoyancy-providing used tires filled with waterproof foam connected to the support and wave energy structure. A mechanical and electrical utilities structure is connected to and partially supported above a water level by the support and wave energy structure. The support and wave energy structure has tubes that are sealed and joined at ends forming a three dimensional structure of vertical and horizontal tubes. Additionally, multiple used tires are mounted side-by-side on the tubes and both the used tires and the tubes are filled with waterproof foam which is used to provide buoyant support to the floatable generator and high speed wind resister. The floatable generator and high speed wind resister has anchor chains attached on each lower corner of the tubes keeping the invention in place.

The support and wave energy structure has roller bearings connected to opposite sides of the structure, an axle mounted in the roller bearings, stainless steel sleeves fixed on the ends of the axle and turbine blades on a gear or pulley attached to the axle. The support and wave energy structure is positioned in such a way that the axle is perpendicular to waves so that the turbine blades, which are backward curved and have convex leading surfaces and concave trailing surfaces, can be rotated in a uniform circular direction by waves proceeding toward shore and under current returning from shore.

The mechanical and electrical utilities structure has vertical I beams connected to the support and wave energy structure and horizontal I beams connected to the tops of the vertical I beams and a grating platform on which level stabilizing tanks and sea water fill and drain valves are mounted. Additionally mounted on the grating platform are a gear box, generators, battery box, and wind resisters made of recycled tires. The gear box is connected to the gear or pulley on the axle of the support and wave energy structure with a belt or chain.

Multiple floatable generator and high speed wind resisters and multiple dummy floats are alternately connected side-by-side with connecting chains and used tires filled with waterproof foam mounted on the chains. The dummy floats have vertical tubes and lower and upper horizontal tubes sealed and joined at the ends and holding side-by-side used tires filled with waterproof foam. The dummy floats have anchor chains attached on each lower corner of the tubes keeping them in place. They additionally have vertical I beams connected to the tubes and horizontal I beams connected to the vertical I beams and to grating platforms where wind resisters made of used tires, level stabilizing tanks, and sea water fill and drain valves are mounted.

Dummy floats have outward extending weir plates connected to the vertical I beam supports on the seaward side and joined at ends in a V-shape for redirecting waves to the turbine blades of floatable generators. They also have debris screens for intercepting floating debris to prevent damage to the turbine blades. Additionally, the alternately connected floatable generator and high speed wind resisters and dummy floats provides the added benefit of shore protection from strong waves.

Both the floatable generator and high speed wind resisters and the dummy floats have habitat and wind energy structures with wind turbines and wind resisters, where the resisters are made out of recycled tires, mounted above the grating platforms.

The generators located on the floatable generator and high speed wind resisters and the dummy floats are interconnected and an electric transmission cable is connected to power lines on shore.

These and further and other objects and features of the invention are apparent in the disclosure, which includes the above and ongoing written specification, with the claims and the drawings.

DETAILED DESCRIPTION

Figure 1:
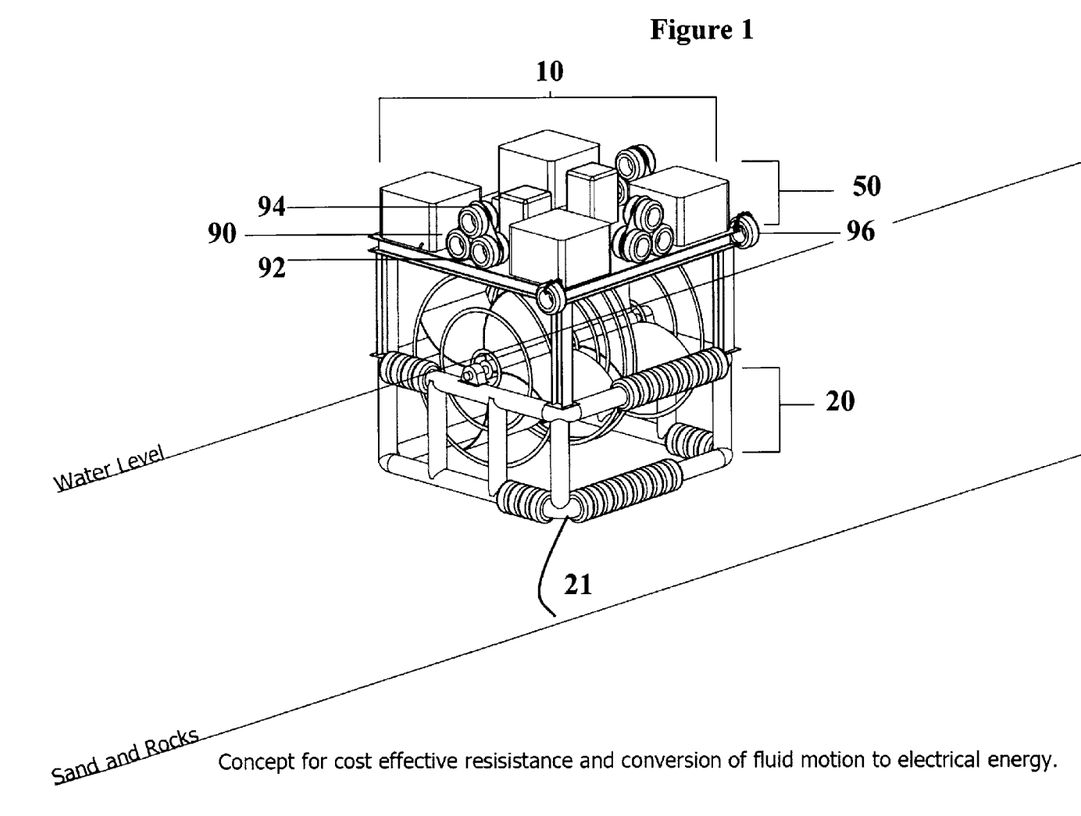
FIG. 1 is a perspective view showing an end, side, and top of the wave and under current, and generator and high speed wind resister.

The new wind resistance electricity generator structure 10, sides 12 and ends 14 and 16, open bottom 18 and an upper deck. Buoyancy is provided by a lower buoyant support structure 20. The lower support structure supports turbine fan blades 40 and the electrical and mechanical support structure 50 on which generators 70 and tanks 60 are mounted.

The lower support structure 20 is made of large aluminum tubes 22 on which are mounted used tires 100 filled with waterproof foam. The tubes 22 are sealed and joined at the ends. Four lower horizontal tubes 24 and four upper horizontal tubes 26 are joined by vertical tubes 28 at the corners of the sides 12 and ends 14 and two vertical tubes 28 on the sides 12.

All of the tubes provide buoyancy and are enclosed and foam filled which provide added buoyancy and protection from impacts. Anchor chains 21 extend 80 to 100 feet or more from corners of lower support structure 20.

Bearing blocks 32 are mounted on the centers of the upper side tubes 26. The bearing blocks support an aluminum axle 34 which has welded bushings 36 on which backward curved turbine blades 40 are welded. Strengthening hoops 42, 44, 46 welded on sides edges 48 of the blades 40. The blades are about 8 feet wide, and the outer hoops 46 have a diameter of about 16 feet. The blades and the hoops are made of ¼ inch aluminum sheets.

The mechanical and electrical utilities support structure 50 is constructed of aluminum I beams 52. Four vertical I beams 52 have lower ends welded to joints 54 of the tubes 26. Upper ends of the vertical I beams 52 are welded to ends of four horizontal I beams 56. Grating platform 58 is connected to the four horizontal I beams 56. Four leveling stabilizing tanks 60 are mounted on corners of the grating platform 58. Tanks 60 have sea water fill valves and drain valves 62, and are filled by small pumps to make the wind resistance generator sink to the desired level. Generators 70 are mounted close to the center of the platform 58. A battery 72 is connected to the generators.

Figure 2:
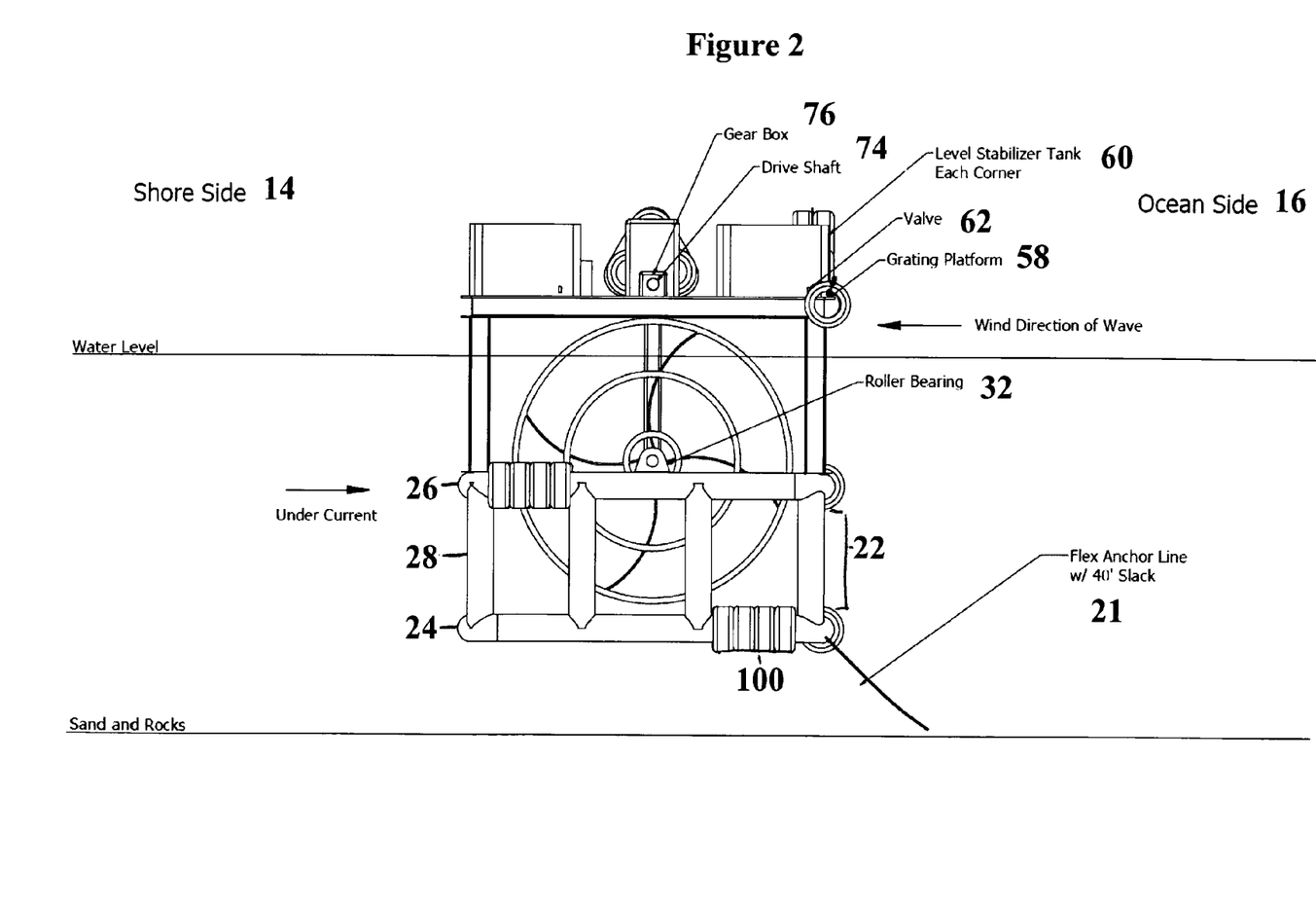
FIG. 2 is a side elevation of the generator and wind resister shown in FIG. 1.

FIG. 2 is a side elevation of the generator and wind resister. As shown schematically in FIG. 2, the generators 70 are driven by drive shafts 74 and gears in a gear box 76. A belt or chain 78 connects drive shaft 74 to a pulley or gear on axle 34.

FIGS. 1 and 2 show wind resisters 90 having tire mounting plates 92 welded or bolted bases to grating platform 58. Waterproof-foam filled used tires 94 are connected to the mounting plates 92. Six tires are shown mounted on each of the sides and the ocean facing end 16 of the structure 10. The purpose of the wind resisters is to interrupt flows of wind near the water surfaces in on shore directed weather. Tires 96 are mounted on chains 98 at corners of the ocean facing end 16 of the structure 10.

Figures 3, 4:
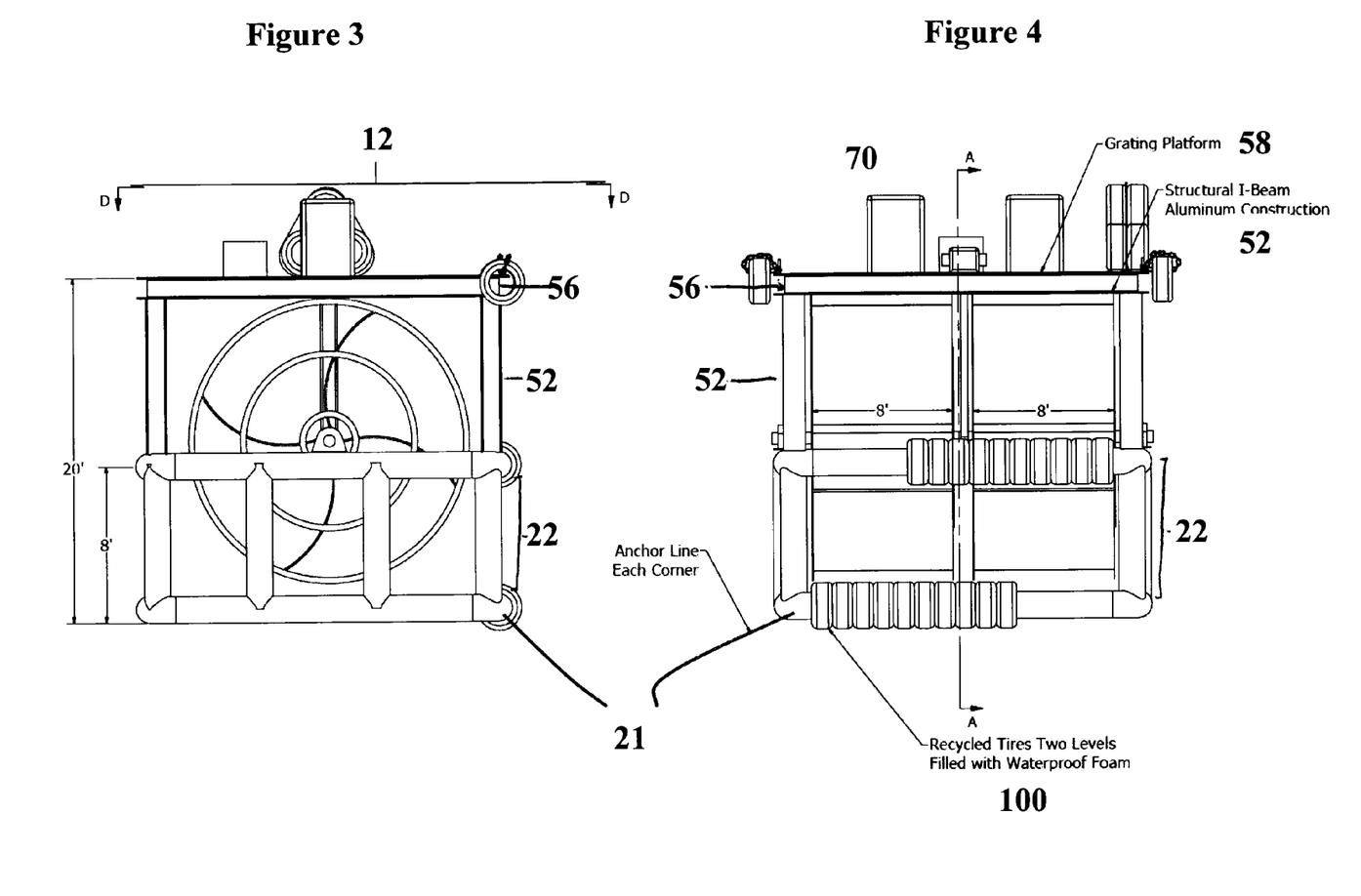
FIG. 3 is a side elevation of the generator and wind resister shown in FIG. 1.
FIG. 4 is an end elevation of the generator and wind resister shown in FIG. 1.

FIG. 3 is a side elevation of the generator and wind resister. A side 12 of structure 10 is shown in FIG. 3. The tubes 22 have been shown without tires 100 for clarity in showing the sealed joints between the tubes. The structure is 20 feet tall in one embodiment. The lower structure is 8 feet tall.

FIG. 4 is an end elevation of the generator 70 and wind resister 90. The elevation of the sea-facing end 16 schematically shows tubes 22 and tires 100. Waterproof foam-filled tires 100 encircle all of the tubes 22 including the vertical tubes 28 and the horizontal tubes 24 in the lower support structure 20.

Drive belt or chain 78 connects a pulley or gear on drive axle 34 to a pulley or gear in the gear box 76. Gears increase the speed of the output drive shafts 74 which drive generators 70.

Figures 5, 6:
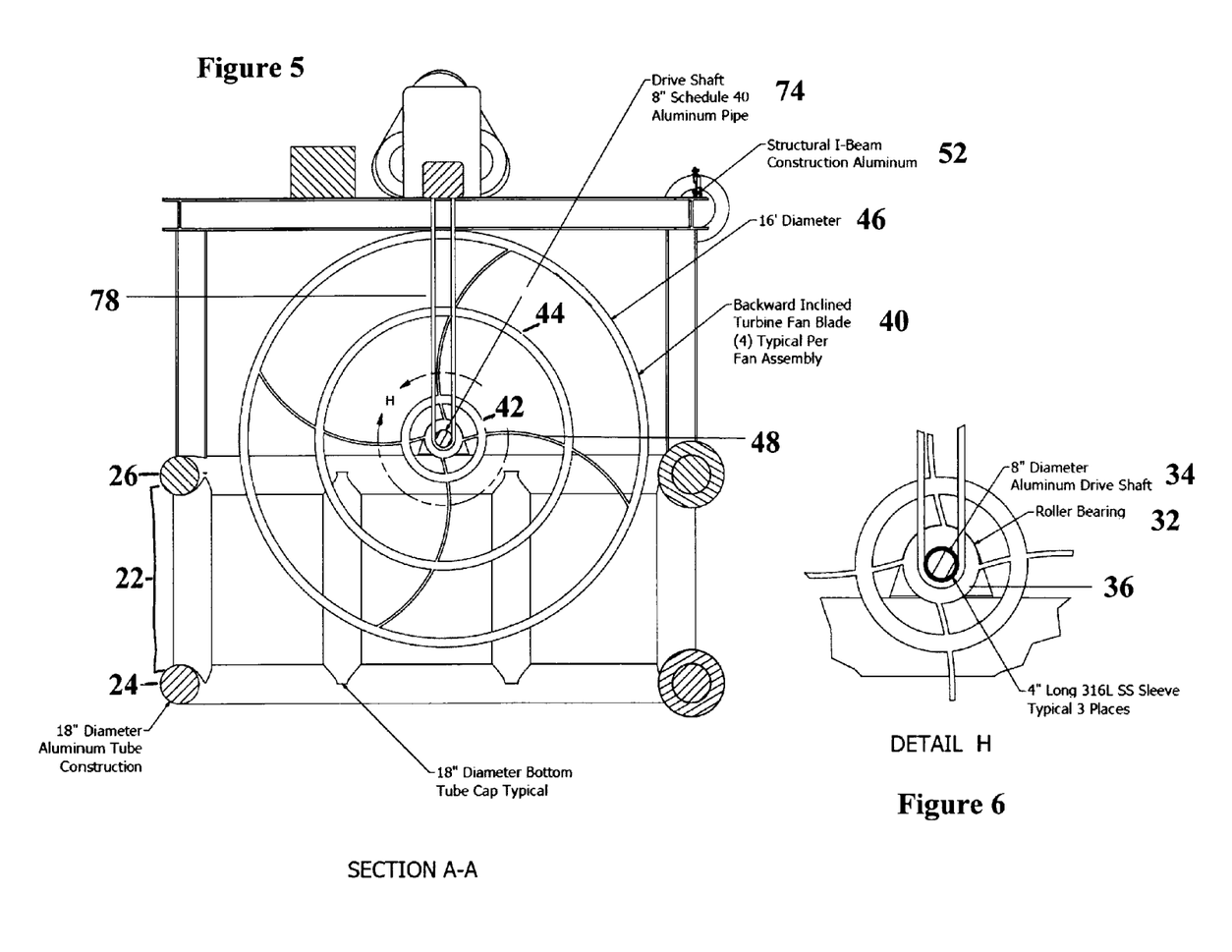
FIG. 5 is an enlarged side detail of the generator and high speed wind resister shown in FIG. 1.
FIG. 6 is a side detail of the roller bearing and drive shaft of the apparatus.

FIG. 5 is an enlarged side detail of the generator and high speed wind resister. FIG. 5 schematically shows construction of the aluminum tubes 22 and the shapes of the sealed joints between the lower tubes 24 and upper tubes 26. Thin walled sealed 18 inch diameter tubes are strengthened by the tightly packed tires which surround the tubes. Elbow joints between the horizontal tubes may be solid. The axle or drive shaft 34 may be an 8 inch schedule 40 aluminum pipe.

FIG. 6 is a side detail of the roller bearing 32 and axle 34 of the apparatus. The detail of the bearing block 32 shows four inch long 316L stainless steel sleeves which are fastened to ends and middle of the drive shaft axle 34 to support the axle in the roller bearing blocks and to fix the pulley or gear in the center of the axle to drive the belt or chain 78.

Figure 7:
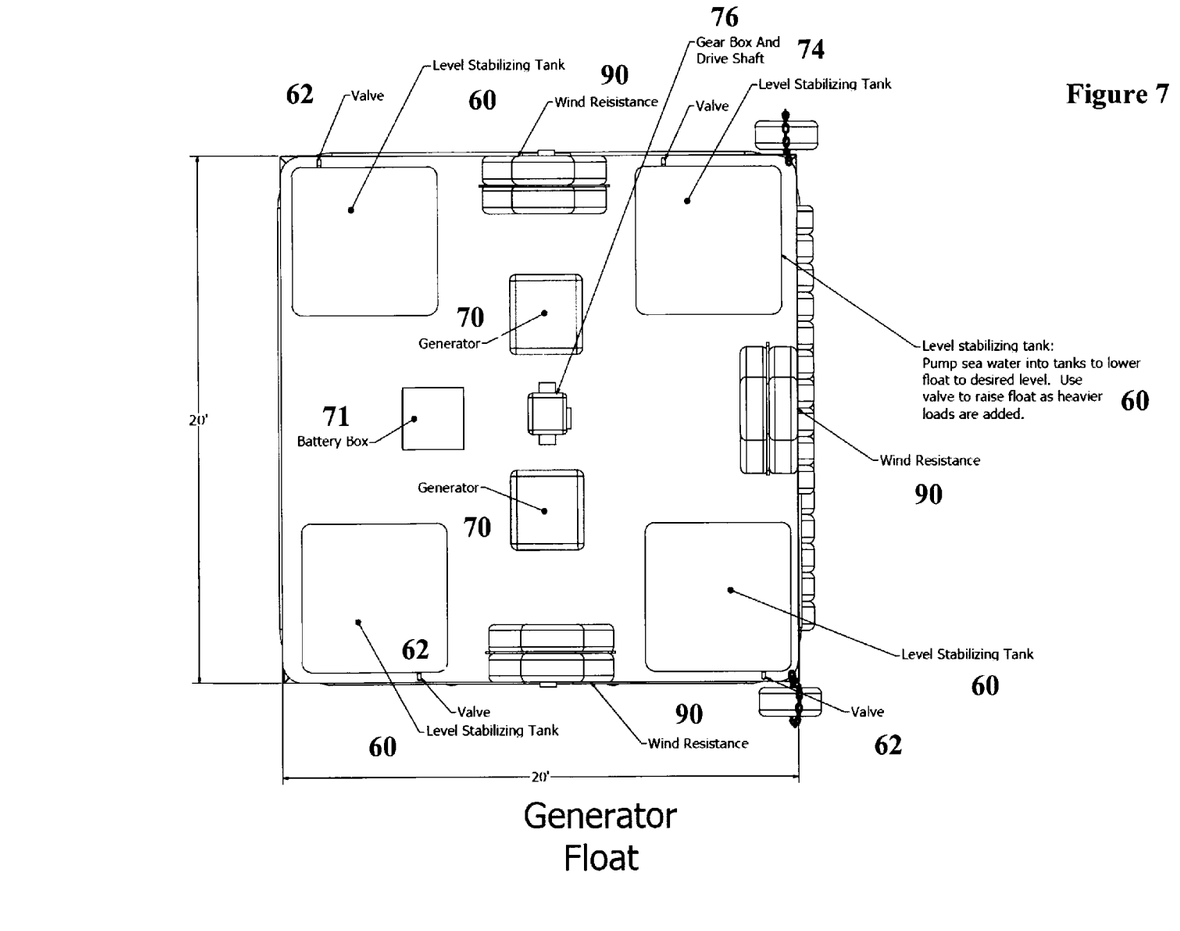
FIG. 7 is a top plan view of the generator and wind resister shown in FIG. 1.

FIG. 7 is a top plan view of the generator and wind resister. Platform 58 is a rigid grating. Level stabilizing aluminum sea water tanks 60 are secured at corners. Gear box 76 and drive shaft 74 drive the generators 70. A battery box 71 is connected to the generators. When placing or removing the heavy generators while afloat, the tanks opposite the far generator may be concurrently filled to stabilize the structure. When the structure is operational the level of the filling in the tanks controls the waterline and the draw of the structure. If an on shore wind tends to lift the sea end 16 of platform 58, water levels may be increases in tanks 60 near the end 16. The placement of the battery box nearer the generators offsets the movement of weight of the wind resister 90, mounting plate 92 and tires 94 on the sea end.

Tires 100 are shown on the sea facing upper horizontal tube. Similar tires mounted on all of the tubes surround the structure. Tires 96 are held by chains 98 on forward corners of the platform 58 at the sea facing end 16.

Figure 8:
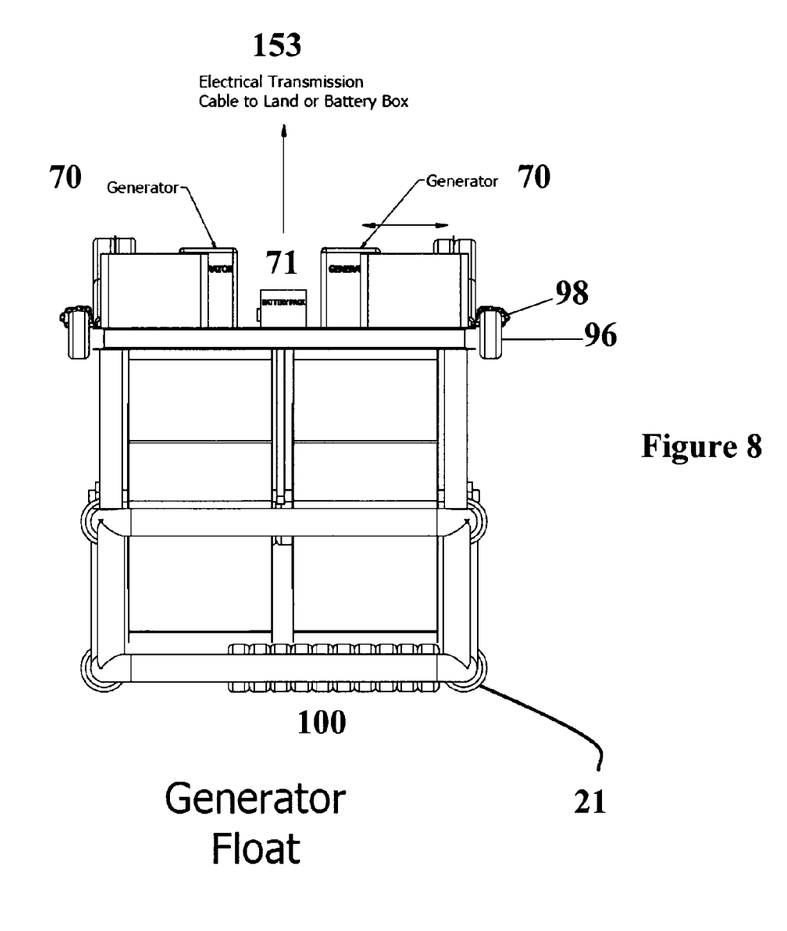
FIG. 8 is an end elevation of the generator and wind resister shown in FIG. 1.

FIG. 8 is an end elevation of the generator and wind resister. The view of the shore facing end of the structure 10 shows the battery box 71, generators 70 and leveling tanks 60. Some of the buoyancy and protective tires 100 are shown. A line of structures 10 may be chained side-to-side. Fully equipped structures 10 are referred to as generator floats 10.

Figure 9:
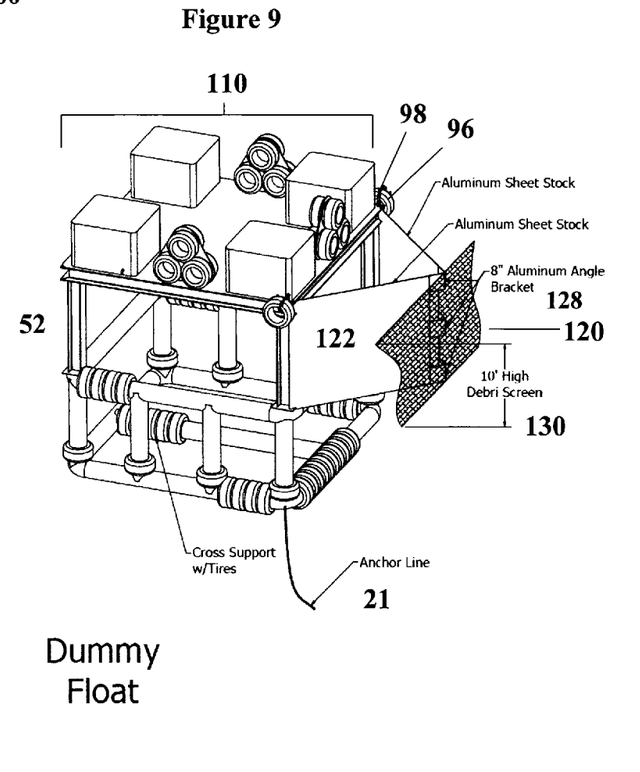
FIG. 9 is a perspective view of the dummy float.

FIG. 9 is a perspective view of the dummy float. Dummy floats 110 have structures 110 similar to generator float structures with an exceptions that generators and a battery box are not included. The same anchor chains 21 and tires 96 mounted on chains 98 at the corners of the ocean facing end 16 of the structure 110 are used.

Figure 10:
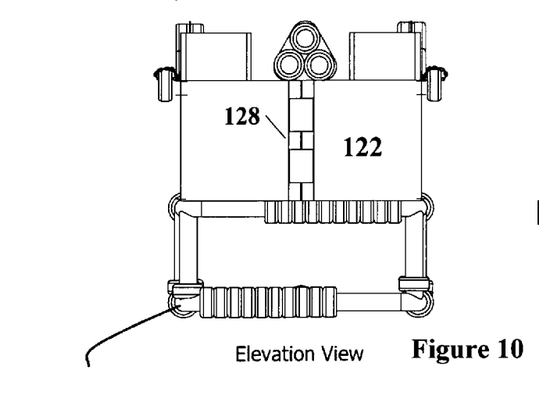
FIG. 10 is an elevation view of the dummy float.
Figure 11:
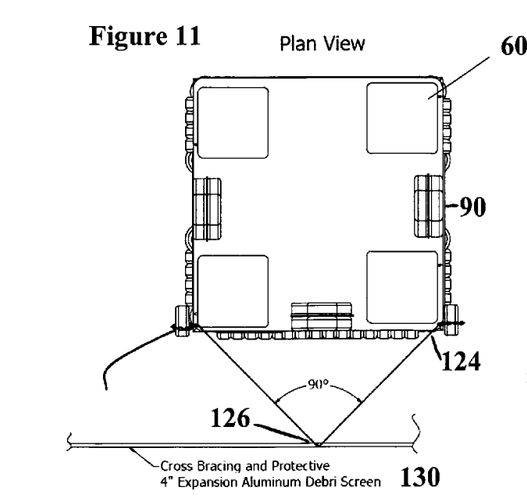
FIG. 11 is a plan view of the dummy float.

Dummy floats 110 shown in FIGS. 9, 10, and 11 have weirs 120 which are V-shaped structures extending outward from seaward vertical I beams 52. The weirs have two plates 122 connected by welding or bolting rearward ends 124 of the plates to the I beams 52. Front ends 126 of plates have brackets 128 which connect to a screen 130 about 10 feet tall. The screen 130 intercepts floating debris which might damage the turbine blades.

Figures 12, 13, 14:
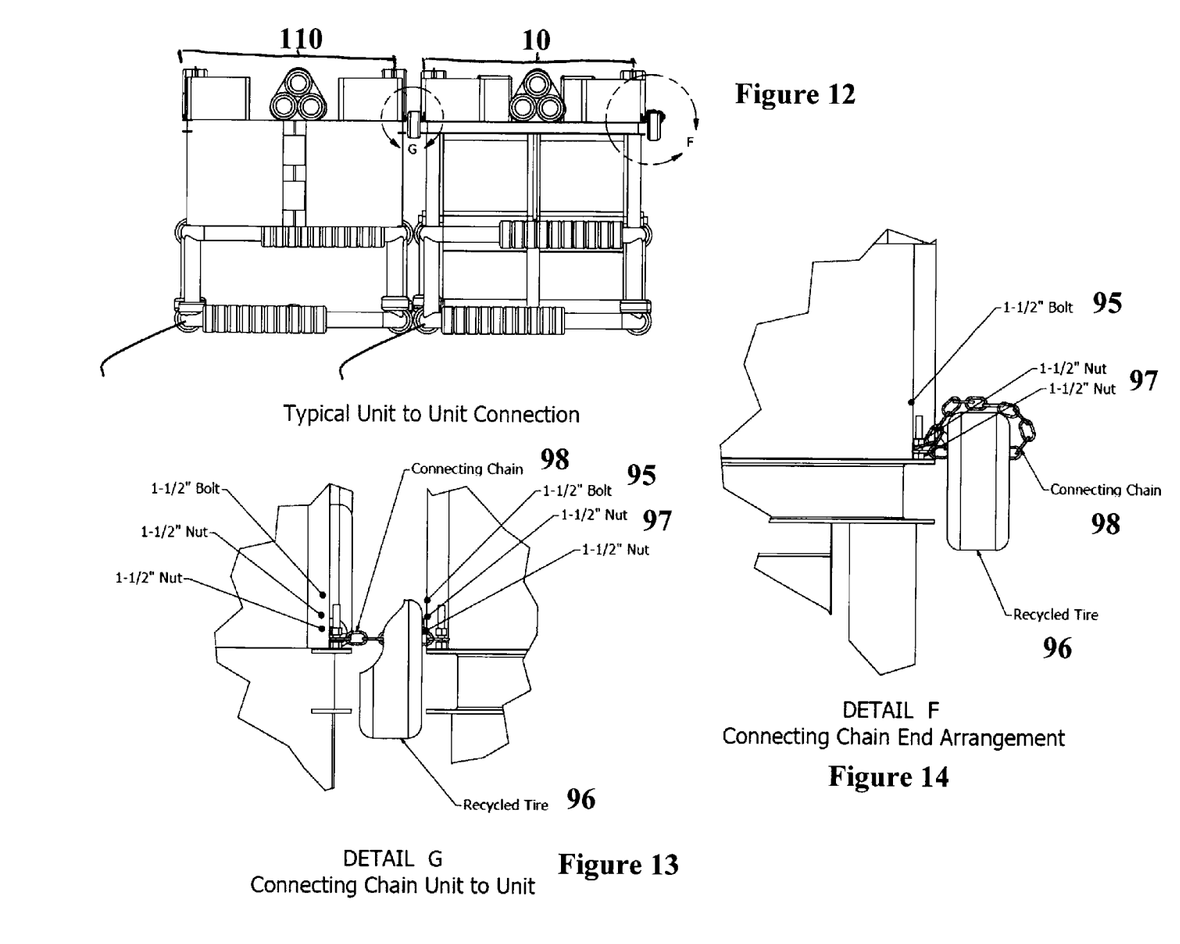
FIG. 12 is an illustration of a unit to unit connection.
FIG. 13 is an illustration of the connecting chain unit to unit.
FIG. 14 is an illustration of the connecting chain end arrangement.

FIGS. 12 and 13 are illustrations of a unit to unit connection. Dummy floats 110 and generator floats 10 are connected with a tire 96 mounted on a connecting chain 98 at the corners of the ocean facing end 16 of the generator and dummy floats 10, 110. One embodiment attaches the connecting chain 98 to the generator float 10 and dummy float 110 using 1½" nuts 97 and bolts 95. FIG. 14 is an illustration of the connecting chain 98 end arrangement. This is similar to the unit to unit connection arrangement shown in FIGS. 12 and 13, with the exception that the connecting chain 98 wraps around the tire 96 and is connected back to the dummy float 110 instead of connected to the generator float 10.

Figure 15:
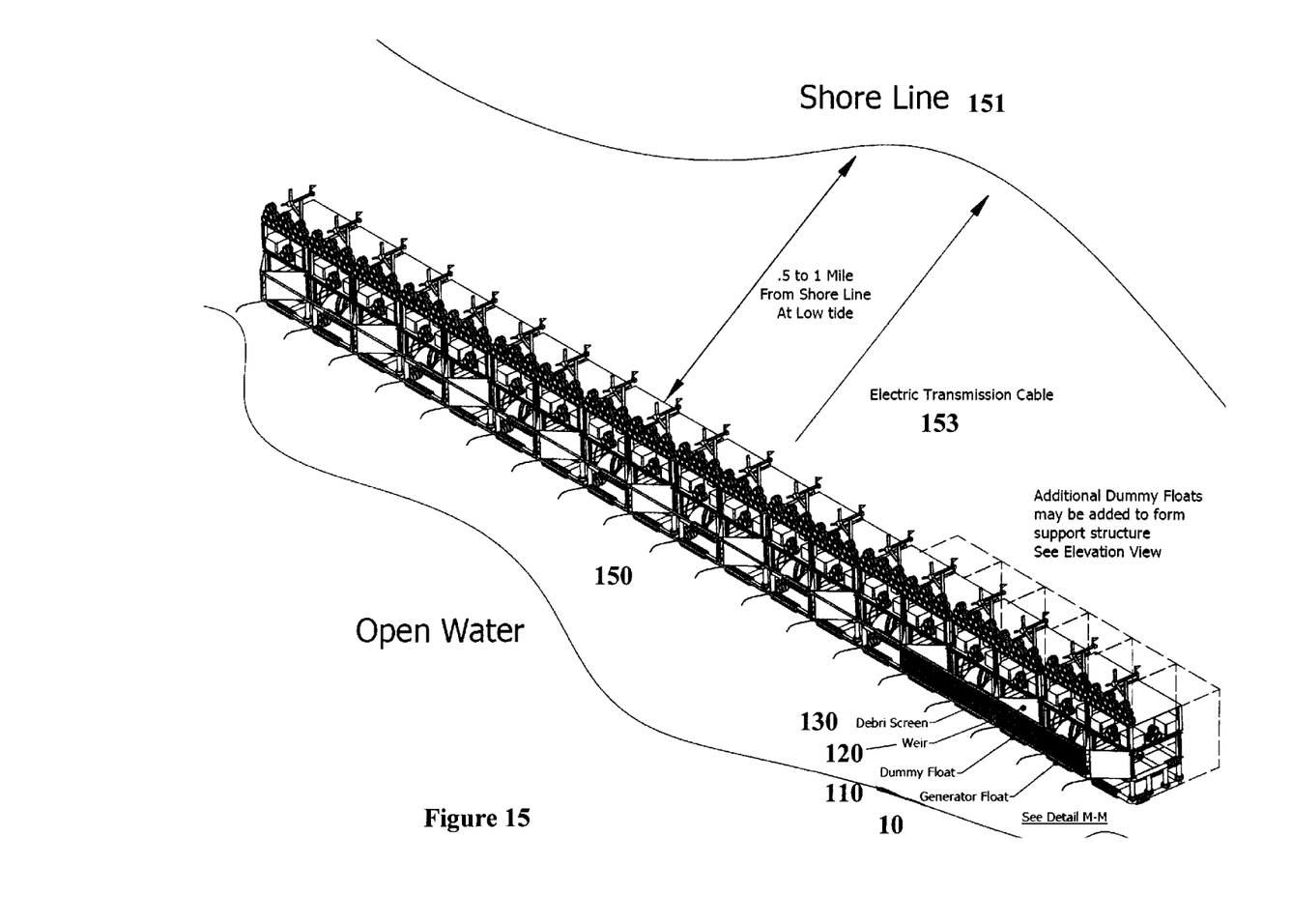
FIG. 15 is a perspective view of coupled generator and dummy floats spaced from the shore line.

FIG. 15 is a perspective view of coupled generator and dummy floats spaced from the shore line. The V-shaped weirs 120 direct and focus waves to the upper turbine blades 40 in the generator floats 10 when the generator floats 10 and dummy floats 110 are alternated in a connected line 150 of floats 10 and 110. As shown in FIG. 15, the connected line 150 of floats is anchored about 0.5 to 1 mile from a shore line 151 at low tide. The line 150 of alternately connected floatable generator and high speed wind resisters 10 and dummy floats 110 shown in FIG. 15 provides the added benefit of shore protection from strong waves.

Generators 70 are interconnected, and an electric transmission cable 153 is connected to power lines on shore. The connected line 150 of floats 10 and 110 is shown with upper platforms 158 supported on vertical and horizontal I beams 152, 156 supporting seaward facing high wind resisters 90 having mounting plates 92 welded or bolted to the upper grating platform 158. Wind powered generators 160 are also mounted on the upper grating platforms 158.

Figure 16:
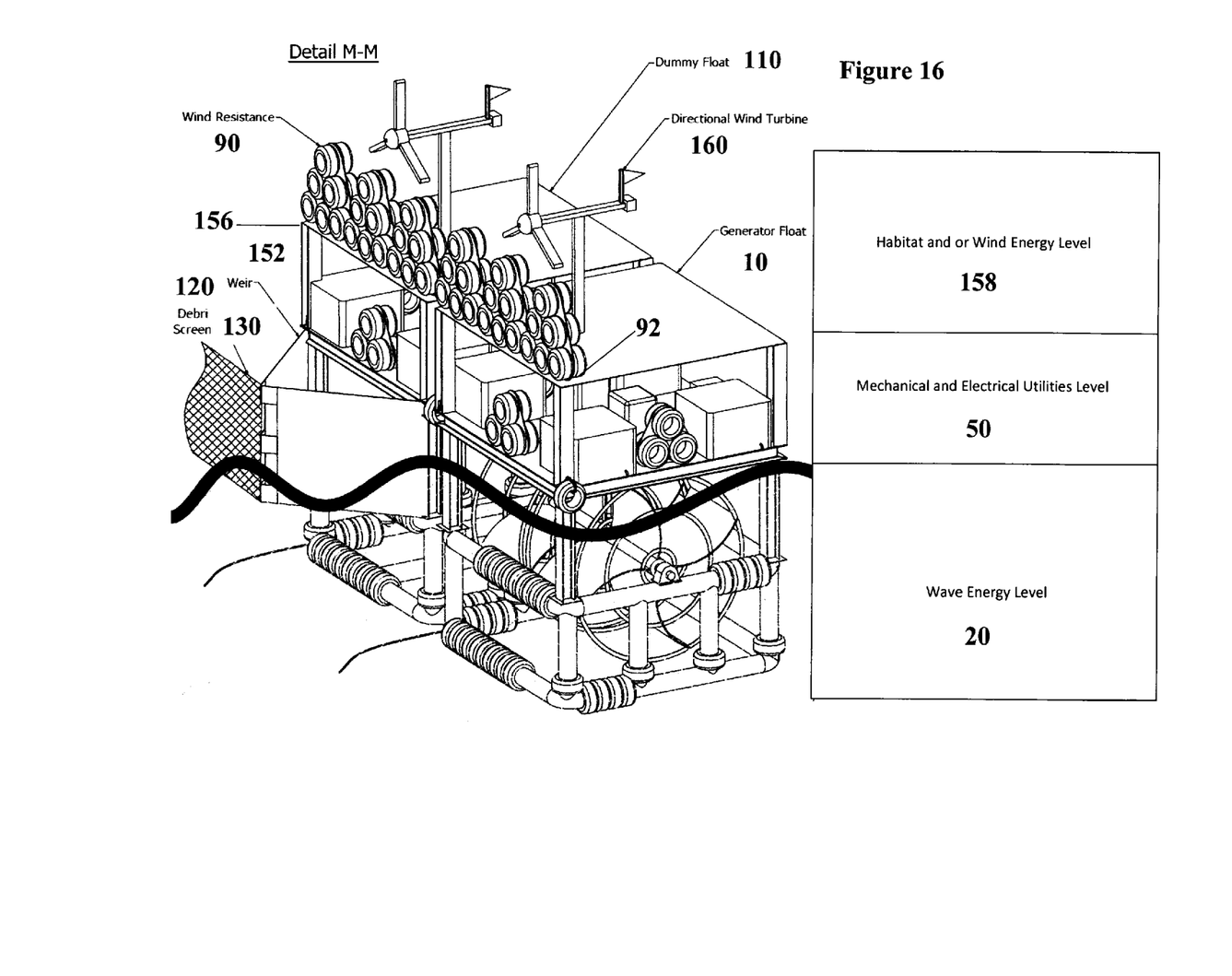
FIG. 16 shows the habitat and or wind energy, mechanical and electrical utilities, and wave energy structures respectively.

FIG. 16 is a perspective view of a generator float 10 coupled with a dummy float 110, and an illustration of the habitat and or wind energy 158, mechanical and electrical utilities 50, and wave energy structures 20 respectively.

While the invention has been described with reference to specific embodiments, modifications and variations of the invention may be constructed without departing from the scope of the invention, which is defined in the following claims.

The invention claimed is:

1. An apparatus comprising a floatable generator and high speed wind resister further comprising a support and wave energy structure, multiple buoyancy-providing used tires filled with waterproof foam connected to the support and wave energy structure, and a mechanical and electrical utilities structure connected to and supported at least partially above a water level by the support and wave energy structure, wherein the support and wave energy structure further comprises tubes, wherein the multiple used tires filled with waterproof foam are mounted vertically and axially adjacent side by side and radially on the tubes, wherein the tubes are sealed and are joined at ends and form a three dimensional structure of vertical and horizontal tubes, and wherein the sealed and joined tubes and the multiple used tires filled with waterproof foam provide buoyant support to the support and wave energy structure and to the mechanical and electrical utilities structure and further comprising anchor chains attached on each lower corner of the tubes.

2. The apparatus of claim 1, further comprising roller bearings connected to opposite sides of the support and wave energy structure, an axle having ends mounted in the roller bearings, stainless steel sleeves fixed on the ends of the axle mounted in the roller bearings, turbine blades connected to the axle and at least on gear or pulley attached to the axle.

3. The apparatus of claim 2, wherein the support and energy wave structure is positioned so that the axle is about perpendicular to waves and wherein the turbine blades comprise backward curved turbine fan blades having convex leading surfaces and concave trailing surfaces when rotated in a uniform circular direction by waves proceeding toward a shore and under current returning from the shore.

4. The apparatus of claim 2, wherein the mechanical and electrical utilities structure further comprises vertical structural I beams having bases connected to the support and wave energy structure, horizontal I beams connected to tops of the vertical I beams, a grating platform connected to the horizontal I beams, level stabilizing tanks mounted on corners of the grating platform and sea water fill and drain valves connected to the level stabilizing tanks.

5. The apparatus of claim 4, further comprising a gear box, generators, battery box, and wind resisters mounted on the grating platform, a belt or chain connected to the gear box and to the gear or pulley on the axle, and drive shafts connected to the gear box and the generators.

6. The apparatus of claim 5, wherein the wind resisters further comprise frames connected to the grating platform and recycled tires filled with waterproof foam fastened to the frames.

7. An apparatus comprising a floatable generator and high speed wind resister further comprising a support and wave energy structure, multiple buoyancy-providing used tires filled with waterproof foam connected to the support and wave energy structure, and a mechanical and electrical utilities structure connected to and supported at least partially above a water level by the support and wave energy structure, further comprising multiple floatable generator and high speed wind resisters and multiple dummy floats alternately connected side by side with the multiple floatable generator and high speed wind resisters and interposed between the generator and high speed wind resisters and connected together with connecting chains and used tires filled with waterproof foam mounted on the chains, wherein the dummy floats further comprise vertical tubes and lower and upper horizontal tubes holding side-by-side used tires filled with waterproof foam, wherein the tubes are sealed and are joined at ends, and wherein anchor chains are attached on each lower corner of the tubes, an upper structure having vertical structural I beams connected to the support structure tubes, horizontal I beams connected to upper ends of the vertical I beams and grating platforms connected to the horizontal I beams, wind resisters, level stabilizing tanks mounted on corners of the grating platform, and sea water fill and drain valves connected to the level stabilizing tanks, wherein the sea water fill and drain valves admit pumped sea water into the stabilizing tanks and release the water to raise or lower the dummy floats as load weight varies.

8. The apparatus of claim 7, further comprising outward extending weir plates connected to the vertical I beam supports on seaward ends of the dummy floats, the weir plates being joined at ends in a V-shape for redirecting waves to the turbine blades of adjacent floatable generators, and further comprising debris screens connected between outer ends of the weir plates of the dummy floats for intercepting floating debris and preventing damage to the turbine blades.

9. The apparatus of claim 8, further comprising wind turbine generators mounted on the grating platforms.

10. The apparatus of claim 8, further comprising habitat and wind energy structures with wind turbine generators mounted above the grating platforms.

11. The apparatus of claim 8, further comprising structures mounted above the grating platforms, and habitats, wind energy generators and wind resisters mounted on the third structures, wherein the wind resisters further comprise frames connected to the structures and recycled tires connected to the frames, and wherein the wind energy generators further comprise directional wind turbines and wind turbine generators mounted on the structures.

12. A method comprising providing a floatable generator and high speed wind resister further comprising providing a support and wave energy structure having buoyant sealed tubes, providing multiple buoyant used tires filled with waterproof foam mounted side by side and radially on the buoyant sealed tubes connected to the support and wave energy structure, and providing a mechanical and electrical utilities structure connected to and supported at least partially above a water level by the support and wave energy structure.

13. The method of claim 12, further comprising mounting a habitat and wind energy structure on top of the mechanical and electrical utilities structure, the habitat and wind energy structure further comprising wind resisters, directional wind turbines and wind turbine generators, wherein the wind resisters are recycled tires.

14. The method of claim 12, further comprising generating electricity using backward curved turbine fan blades connected to an axle and at least one gear or pulley attached to the axle, wherein stainless steel sleeves are connected to the ends of the axle mounted in roller bearings connected to opposite sides of the support and wave energy structure, wherein the backward curved turbine fan blades are rotated in a circular direction by waves proceeding toward a shore and under current returning from the shore, and using directional wind turbines.

15. The method of claim 14, further comprising sending generated electricity to shore using an electrical transmission cable connected to power lines on land.

16. The method of claim 13, further comprising resisting wind to interrupt flow of wind near water surfaces in onshore directed weather using recycled tires connected to tire mounting plates welded or bolted to the mechanical and electrical utilities structure and to the base of the habitat and or wind energy structure.

17. The method of claim 12, wherein the floatable generator and high speed wind resister is kept in place by anchoring it with anchor chains attached on each lower corner of the tubes comprising the support and wave energy structure and is stabilized using level stabilizing tanks mounted on the corners of the mechanical and electrical utilities structure, and filling or draining sea water in the level stabilizing tanks to raise or lower the floatable generator and high speed wind resister.

18. A method comprising providing a floatable generator and high speed wind resister further comprising providing a support and wave energy structure, providing multiple buoyant used tires filled with waterproof foam connected to the support and wave energy structure, and providing a mechanical and electrical utilities structure connected to and supported at least partially above a water level by the support and wave energy structure, further comprising alternately connecting side-by-side floatable generator and wind resisters with dummy floats using connecting chains and used tires filled with waterproof foam mounted on the connecting chains, wherein the dummy floats further comprise vertical tubes and lower and upper horizontal tubes filled with side-by-side used tires filled with waterproof foam, wherein the tubes are sealed and are joined at ends, and wherein anchor chains are attached on each lower corner of the tubes, an upper structure having vertical structural I beams connected to the support structure tubes, horizontal I beams connected to upper ends of the vertical I beams and a grating platform connected to the horizontal I beams, wind resisters, level stabilizing tanks mounted on corners of the grating platform, and sea water fill and drain valves connected to the level stabilizing tanks, wherein the sea water fill and drain valves admit pumped sea water into the stabilizing tanks and release the water to raise or lower the dummy floats as load weight varies.

19. The method of claim 18, further comprising directing and focusing waves to pass through the floatable generators using V-shaped weir plates and protecting the backward curved turbine blades of the floatable generator and high speed wind resisters by intercepting floating debris which might damage the turbine blades using debris screens connected between the weir plates of nearby dummy floats.

20. The method of claim 18, further comprising mounting a habitat and wind energy structure comprising wind resisters, wherein the wind resisters are recycled tires, directional wind turbines and wind turbine generators above the grating platforms.

21. The method of claim 20, further comprising generating electricity using directional wind turbines and further comprising sending generated electricity to shore using an electrical transmission cable connected to power lines on land.

22. The method of claim 20, further comprising resisting wind to interrupt the flow of wind near the water surfaces in onshore directed weather using recycled tires connected to tire mounting plates welded or bolted to the grating platforms.

* * * * *